(12) United States Patent
Lidin et al.

(10) Patent No.: US 10,693,912 B2
(45) Date of Patent: Jun. 23, 2020

(54) METHODS AND USER EQUIPMENT FOR EXCHANGING SERVICE CAPABILITIES

(71) Applicant: Telefonaktiebolaget LM Ericsson (publ), Stockholm (SE)

(72) Inventors: Jan Lidin, Huddinge (SE); Ester Gonzalez de Langarica, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 364 days.

(21) Appl. No.: 15/034,724

(22) PCT Filed: Nov. 6, 2013

(86) PCT No.: PCT/SE2013/051297
§ 371 (c)(1),
(2) Date: May 5, 2016

(87) PCT Pub. No.: WO2015/069154
PCT Pub. Date: May 14, 2015

(65) Prior Publication Data
US 2016/0285915 A1  Sep. 29, 2016

(51) Int. Cl.
*H04L 29/06* (2006.01)
*G06F 21/00* (2013.01)
(Continued)

(52) U.S. Cl.
CPC ............ *H04L 63/20* (2013.01); *H04L 63/102* (2013.01); *H04L 63/105* (2013.01);
(Continued)

(58) Field of Classification Search
None
See application file for complete search history.

(56) References Cited

U.S. PATENT DOCUMENTS

| 7,466,810 | B1 * | 12/2008 | Quon | H04M 3/42229 |
| | | | | 379/201.01 |
| 8,848,690 | B2 * | 9/2014 | Bleckert | H04M 7/0024 |
| | | | | 370/352 |

(Continued)

FOREIGN PATENT DOCUMENTS

| EP | 2 645 672 A1 | 3/2013 |
| RU | 2352985 C2 | 4/2009 |

(Continued)

OTHER PUBLICATIONS

Russian Decision on Grant issued in Russian Application No. 2016122055/08(034505) dated Nov. 17, 2017, 30 pages.

(Continued)

*Primary Examiner* — Lisa C Lewis
(74) *Attorney, Agent, or Firm* — Rothwell, Figg, Ernst & Manbeck, P.C.

(57) ABSTRACT

A method performed by a first UE. The method includes: the first UE sending via a first signaling protocol to a network node a service capabilities request, the service capabilities request requesting service capability information for a second UE; the first UE receiving from the network node a response to the service capabilities request, the response rejecting the service capabilities request; and as a result of receiving the response rejecting the service capabilities request, the first UE sending to the second UE, via a second signaling protocol other than the first signaling protocol, a service capabilities exchange invitation requesting an exchange of service capabilities.

19 Claims, 9 Drawing Sheets

(51) Int. Cl.
*H04W 8/24* (2009.01)
*H04W 12/02* (2009.01)
*H04W 12/08* (2009.01)
*H04L 12/24* (2006.01)

(52) U.S. Cl.
CPC ............ *H04L 63/205* (2013.01); *H04L 69/18* (2013.01); *H04W 8/24* (2013.01); *H04W 12/02* (2013.01); *H04W 12/08* (2013.01); *H04L 41/5006* (2013.01); *H04L 69/24* (2013.01)

(56) References Cited

U.S. PATENT DOCUMENTS

| | | | | |
|---|---|---|---|---|
| 9,037,732 | B2* | 5/2015 | Zhu | H04L 65/1069 709/228 |
| 9,106,490 | B2* | 8/2015 | Venkitaraman | H04L 29/12311 |
| 2006/0218291 | A1* | 9/2006 | Zhu | H04L 65/1069 709/229 |
| 2007/0156909 | A1* | 7/2007 | Osborn | H04L 67/16 709/227 |
| 2007/0259651 | A1* | 11/2007 | Bae | H04L 29/06027 455/412.1 |
| 2008/0052393 | A1 | 2/2008 | McNaughton et al. | |
| 2008/0137645 | A1* | 6/2008 | Skog | H04W 88/02 370/352 |
| 2009/0061776 | A1* | 3/2009 | Takei | H04W 8/005 455/41.3 |
| 2010/0058445 | A1* | 3/2010 | Zhu | H04L 63/08 726/4 |
| 2010/0093346 | A1* | 4/2010 | Song | H04L 41/12 455/435.1 |
| 2010/0099389 | A1* | 4/2010 | Zhu | H04L 29/12301 455/414.1 |
| 2010/0169483 | A1* | 7/2010 | Jalkanen | H04L 65/1016 709/224 |
| 2010/0312897 | A1* | 12/2010 | Allen | H04L 12/1822 709/227 |
| 2011/0019650 | A1* | 1/2011 | van Niekerk | H04L 65/1069 370/338 |
| 2011/0019684 | A1 | 1/2011 | Allain | |
| 2011/0022580 | A1* | 1/2011 | Badulescu | H04L 67/24 707/712 |
| 2011/0040836 | A1* | 2/2011 | Allen | H04L 65/1093 709/205 |
| 2011/0231544 | A1* | 9/2011 | Javenpaa | H04L 67/24 709/224 |
| 2011/0250895 | A1* | 10/2011 | Wohlert | H04W 4/16 455/445 |
| 2011/0317569 | A1* | 12/2011 | Kneckt | H04L 5/0091 370/252 |
| 2013/0218942 | A1 | 8/2013 | Willis et al. | |
| 2013/0287016 | A1 | 10/2013 | Stille et al. | |
| 2014/0057667 | A1* | 2/2014 | Blankenship | H04L 67/303 455/500 |
| 2014/0226657 | A1* | 8/2014 | Bouvet | H04L 65/1016 370/352 |
| 2014/0235208 | A1* | 8/2014 | Farmer | H04W 4/02 455/411 |

FOREIGN PATENT DOCUMENTS

| | | |
|---|---|---|
| WO | 2006/068545 A1 | 6/2006 |
| WO | 2009/010632 A1 | 1/2009 |
| WO | 2012140113 A1 | 10/2012 |

OTHER PUBLICATIONS

International Search Report of the ISA issued in International application No. PCT/SE2013/051297, dated Jul. 11, 2014, 4 pages.
Written Opinion issued by the ISA in International application No. PCT/SE2013/051297, dated Jul. 11, 2014, 8 pages.
"Rich Communication Suite 5.1 Advanced Communications Services and Client Specification" Version 2.0, GSM Association, May 3, 2013 482 pages.
Translation of Russian Search Report issued in Russian Application No. 2016122055/08(034505) dated Aug. 3, 2017, 2 pages.
Extended European Search Report issued in related Application No. 13 896 894.6, dated Oct. 14, 2016, 11 pages.
Extended European Search Report dated Sep. 11, 2019 issued in European Patent Application No. 19152923.9. (9 pages).

* cited by examiner

METHODS AND USER EQUIPMENT FOR EXCHANGING SERVICE CAPABILITIES

CROSS REFERENCE TO RELATED APPLICATION(S)

This application is a 35 U.S.C. § 371 National Phase Entry Application from PCT/SE2013/051297, filed Nov. 6, 2013, designating the United States, the disclosure of which is incorporated by reference.

TECHNICAL FIELD

The present disclosure relates to methods for exchanging service capabilities between two user equipments, and user equipments capable of executing such methods.

BACKGROUND

With an increasing number of services made available to end-users subscribing to fixed or wireless network access, there is a rising demand for making such services easily accessible, not only during established usage but also as an initial introduction to the services.

Rich Communication Services (RCS) is a group of services which relate to a global program that deploys inter-operator services within an industry ecosystem. RCS has been created by GSM Association (GSMA) with a purpose of offering richer communication services supported by a strong ecosystem and a variety of architecture implementation options.

RCE and Voice over Long Term Evolution (VoLTE) share the same IP Multimedia Subsystem (IMS) investment and leverages the same IMS capabilities.

For consumers, RCS combine voice and SMS with instant messaging or chat, live video sharing and file transfer across different types of devices, or user equipments (UE), and networks, and provide main features, such as e.g. an enhanced phonebook, providing service capabilities and enhanced contact information, such as e.g. presence and service discovery; enhanced messaging, which enables a large variety of messaging options, including chat, emoticons, location sharing and file sharing, and enriched calls, which enables multimedia content sharing during a voice call, video call and video sharing.

RCS requires exchanging of service capabilities to be successfully executed between two RCS capable UEs, i.e. that a UE reviles which services it has available to the other UE, prior to establishing of an actual RCS based service between the two UEs.

Section 2.6.2 of RCS 5.1, version 2.0 describes two possible mechanisms for service capabilities exchange, namely SIP OPTIONS and Presence. Even though the standard does not require the service capabilities exchange process to provide any authorization or any privacy management framework, in principle any user can request capabilities associated with another user, being registered to one or more UEs or devices, from any UE or device. When e.g. a service capabilities exchange is executed using the Presence alternative, a privacy framework is made available to the users. Section 2.6.1.3 of RCS 5.1, version 2.0 indicates that when users already have established a social Presence relationship, service capabilities can be requested and acquired via a Presence subscription, but only if the present authorization rules allow that.

Also, nowadays users of Over The Top (OTT) services, such as e.g. Facebook™, Google Hangouts™ or Skype™ are provided with the option of controlling which users can see their service capabilities, and, as a consequence, under such circumstances users must first establish a social relationship before these service capabilities can be exchanged. It is reasonable to expect that also RCS users may want to find corresponding functionality in RCS, i.e. the ability to have control over their service visibility.

A typical scenario, involving two users, communicating via respective UEs may be described as follows, with reference to a simplified signalling scheme illustrated in FIG. 1.

A first user, who is registered with, and capable of communicating via a UE, here referred to as first UE 110a, is an RCS user, i.e. the first user is subscribing to RCS and is using an RCS enabled UE. The first user now wants to communicate with a second user via an IMS network, here represented by IMS core 100, and a second UE 110b.

The second user is very concerned about his privacy. Therefore he decides to limit the number of users he wants to authorize to contact him via RCS services to his family and a limited number of RCS subscribing friends. Such an authorization procedure implies that the first user is only willing to share associated service capabilities related information with a limited list of RCS users, while remaining RCS users who may try to initiate RCS services with the first user will not succeed. Furthermore, the latter category of users will not even be able to become aware of whether or not the first user is an RCS user. Consequently, the second user connects to the IMS core 100 and configures his privacy settings by provisioning his authorization rules accordingly, as indicated in step 1:1 of FIG. 1. Such a provisioning does not include the first user mentioned above.

Even though the first user is a very good friend of the second user, he is not among the friends authorized by the second user in step 1:1, or in any previous authorization provisioning step. There are a number of reasons why the second user may not be among the authorized RCS users. Let us e.g. assume that the first user has just recently acquired an RCS capable or enabled UE and an RSC subscription of which the second user is not yet aware of, i.e. the second user is unaware of that the first user is a potential RCS counterpart.

When the first user has gone through his imported contacts and wants to discover which ones of his contacts who are RCS users, and thus provide for usage of RCS, he initiates a service capabilities exchange request, requesting for a service capabilities exchange to be executed, as indicated with another step 1:2. Typically, such a request is executed by using a commonly known OPTIONS or Presence mechanism as mentioned above. In the present scenario, it is determined by the IMS core 100 that, since the first user has not been authorized to access the requested service capabilities, such a request will result in a response from the IMS core 100 to the first user, rejecting the request, and instead of exposing the capabilities associated with the second user indicating to the first user that the second user is not found, and, thus, that the first user is not authorized to access the service capabilities associated with the second user, as indicated with a final step 1:3. More specifically, the address book of the first user will typically present the second user as a legacy user, having no RCS capabilities, even though in this case the second user is in fact an RCS enabled user who may even be very keen on communicating via such servicers with the first user. More information on this process can be found in chapter 2.6 of RCS 5.1 Advanced Communications Services and Client Specification, Version 3.0, 25 Sep., 2013.

The described deficiency may also be an obstacle for new users discovery and may contribute to the delay of introduction and spreading of use of this type, as well as similar types of services.

SUMMARY

It is an object of the present document to address, or at least alleviate, at least some of the problems described above.

According to a first aspect, a method to be executed in a first UE of a first user for communicating with a second UE of a second user is suggested, wherein the first UE is capable of applying a service which requires exchange of service capabilities between users for enabling the two users to communicate via the mentioned service, and wherein the first user is not authorized to access the service capabilities associated with the second user. The method comprise: providing a service capabilities request, requesting an exchange of service capabilities associated with the two users, where the service capabilities request is provided via a first signaling protocol; identifying a response to the service capabilities request, received by the first UE, as a rejection to the service capabilities request; providing a service capabilities exchange invitation to the second UE, via a second signaling protocol other than the first signaling protocol, wherein the invitation is requesting an exchange of service capabilities associated with the two users; identifying the second user as a user with which the first user cannot communicate via the two UEs and the mentioned service, in case the service capabilities exchange invitation does not result in the requested exchange of service capabilities, or identifying the second user as a user with which the first user can now communicate via the two UEs and the mentioned service, in case the service capabilities exchange invitation results in the requested exchange of service capabilities.

By applying the method suggested above, also a user which has not been authorized to access the service capabilities of another user will be able to request an exchange of service capabilities associated with these two users.

Once the service capabilities exchange process has been finalized the first UE will be able to execute a service which is requiring a service capabilities exchange before service execution when communicating with the second UE can be initiated, at least partly based on the exchanged service capabilities.

In order to enable the first UE to communicate accordingly with the second UE, the signaling protocol other than the first signaling protocol is chosen from signaling protocols which are not affected by any authorization rules of the second user that relates to the mentioned service. Such a signaling protocol may e.g. be a Short Messaging Service (SMS), a short Messaging Service over Session Initiation Protocol (SMS over SIP), or a Multimedia Messaging Services (MMS).

Typically, the service capabilities exchange invitation comprises a text message which relates to the mentioned service. Thereby, a message provided in a service capabilities exchange invitation may e.g. be configured such that further information about a certain service, or type of service, is provided in the invitation.

According to one embodiment, the mentioned service is a Rich Communication Service (RCS). In such a situation the service capabilities exchange invitation may comprise text, and optionally also a link to further RCS related information, typically so that use of RCS is promoted, also among users which are presently not RCS users.

According to one embodiment the service capabilities exchange invitation is a message which is generated automatically, upon identifying the response to the service capabilities exchange request as a rejection of the request, i.e. without requiring any interaction from the user, while according to another embodiment the service capabilities exchange invitation is instead a message which is generated upon user consent of the first user and upon identifying the response to the service capabilities exchange request as a rejection of the request.

According to a second aspect, a corresponding method executable in a second UE of a second user is provided, where the second UE is capable of communicating with a first UE of a first user, and of applying a service which require exchange of service capabilities associated with users, for enabling the two users to communicate via the mentioned service, and wherein the first user is not authorized to access the service capabilities associated with the second user. The method comprise: receiving a service capabilities exchange invitation, requesting an exchange of service capabilities associated with the two users, from the first UE, wherein the invitation is received via a second signaling protocol other than a first signaling protocol which has been previously applied by the first UE when unsuccessfully requesting an exchange of service capabilities associated with the two users; presenting the service capabilities exchange invitation to the second user, such that the second user is provided with the options of allowing the second user to accept or reject the requested service capabilities exchange, in case the second UE is capable of interpreting the service capabilities exchange invitation as a request for exchanging service capabilities, or presenting a message contained in the service capabilities exchange invitation, in case the second UE is not capable of interpreting the service capabilities exchange invitation as a request for exchanging service capabilities.

Once a service capabilities exchange has been executed between the two UEs, the second UE will be able to execute the suggested service when communicating with the first UE, wherein the service execution is executed at least partly based on the exchanged service capabilities.

In association with performing the requested service capabilities exchange the suggested method also comprise: updating the authorization rules of the second user such that the first user is allowed to access the service capabilities associated with the second user, and initiation of the requested service capabilities exchange, in case the second user accepts the service capabilities exchange invitation, or terminating the communication with the first UE and rejecting the requested service capabilities exchange, in case the second user rejects the request or in case the second UE is not capable of interpreting the service capabilities exchange invitation as a request for exchanging service capabilities.

According to a third aspect a first UE capable of communicating with a second UE and of applying a service which requires exchange of service capabilities between users for enabling said users to communicate via the mentioned service is suggested. The suggested first UE comprise a processor and a memory, where the memory comprise instructions which when executed by the processor causes the first UE to: provide a service capabilities request via a first signaling protocol, wherein the request is requesting an exchange of service capabilities associated with the users of the two UEs when a first user, being a user of the first UE, is not authorized to access the service capabilities associated with a second user, being a user of the second UE; identify a response to the service capabilities request, received by the first UE, as a rejection to the service capabilities request; provide a service capabilities exchange invitation to the second UE via a second signaling protocol other than the first signaling protocol, wherein the first UE is requesting an exchange of service capabilities associated with the two users; identify the second user as a user with which the first user cannot communicate via said UEs and the mentioned service, in case the service capabilities exchange invitation does not result in the requested exchange of service capabilities, or identify the second user as a user with which the first user can now communicate via said UEs, in case the service capabilities exchange invitation results in the requested exchange of service capabilities.

The memory of the first UE may further comprise instructions which when executed by the processor causes the first UE to store the exchanged service capabilities associated with the second user. In addition, the memory may further comprise instructions which when executed by the processor causes the first UE to execute the mentioned service at least partly based on the exchanged service capabilities.

As already mentioned above, the signaling protocol other than the first signaling protocol is chosen from signaling protocols which are not affected by any authorization rules of the second user that relates to the mentioned service, which may be e.g. a Short Messaging Service (SMS), a short Messaging Service over Session Initiation Protocol (SMS over SIP), or a Multimedia Messaging Services (MMS).

The memory typically further comprise instructions which when executed by the processor causes the first UE to provide the service capabilities exchange invitation with a text message which relates to the mentioned service, such that, in addition to initiating a service capabilities exchange, the invitation may also have the additional purpose of promoting or informing of a certain service or a group of services.

According to one embodiment the memory further comprise instructions which when executed by the processor causes the first UE to automatically generate the service capabilities exchange invitation upon identifying the response to the service capabilities exchange request as a rejection of the request, while according to another embodiment, the memory instead comprise instructions which when executed by the processor causes the first UE to generate the service capabilities exchange invitation upon user consent and upon identifying the response to the service capabilities exchange request as a rejection of the request.

According to a fourth aspect a first computer program for providing for communication between a first UE and a second UE and for enabling the first UE to apply a service which require exchange of service capabilities between users for enabling these users to communicate via the mentioned service is provided, where the computer program comprises code means which when run on a computer of the first UE causes the computer to: provide a service capabilities request via a first signaling protocol, where the request is configured such that it is requesting an exchange of service capabilities associated with the users of the two UEs, when a first user, being a user of the first UE, is not authorized to access the service capabilities associated with a second user, being a user of the second UE; identify a response to the service capabilities request, received by the first UE, as a rejection to the service capabilities request; provide a service capabilities exchange invitation to the second UE, where the invitation is requesting an exchange of service capabilities associated with the two users, wherein the invitation is provided via a signaling protocol other than the first signaling protocol; identify the second user as a user with which the first user cannot communicate via the two UEs and the mentioned service, in case the service capabilities exchange invitation does not result in the requested exchange of service capabilities, or identify the second user as a user with which the first user can now communicate via the two UEs and the mentioned service, in case the service capabilities exchange invitation results in the requested exchange of service capabilities.

According to a fifth aspect a first computer program product, comprising computer readable code means and a computer program as suggested above, which is stored on a computer readable means, is also provided.

According to a sixth aspect a second UE, capable of communicating with a first UE, such as the one suggested above, and of applying a service which require exchange of service capabilities associated with users, for enabling these users to communicate via the mentioned service, is provided. The second UE comprise a processor and a memory, wherein the memory comprise instructions which when executed by the processor causes the second UE to: receive a service capabilities exchange invitation from the first UE via a second signaling protocol other than a first signaling protocol previously applied by the first UE when unsuccessfully requesting an exchange of service capabilities associated with the users of the two UEs and when the first user, being a user of the first UE, is not authorized to access the service capabilities associated with a second user, being a user of the second UE, the invitation being configured as an invitation requesting an exchange of service capabilities associated with the two users; present options allowing the second user to accept or reject the requested service capabilities exchange, in case the second UE is capable of interpreting the service capabilities exchange invitation as a request for exchanging service capabilities, or present a message contained in the service capabilities exchange invitation, in case the second UE is not capable of interpreting the service capabilities exchange invitation as a request for exchanging service capabilities.

The memory further comprise instructions which when executed by the processor causes the second UE to execute the mentioned service, at least partly based on the exchanged service capabilities associated with the second user.

Furthermore, the memory comprise instructions which when executed by the processor causes the second UE to: update the authorization rules of the second user, such that the first user is allowed to access service capabilities associated with the second user, and initiate the requested service capabilities exchange, in case the user of the second UE accepts the service capabilities exchange invitation, or reject the requested service capabilities exchange, in case the second user rejects the request or in case the second UE is not capable of interpreting the service capabilities exchange invitation as a request for exchanging service capabilities.

According to a seventh aspect, a second computer program for providing for communication between a first UE and a second UE is provided, wherein the second UE is capable of applying a service which requires exchange of service capabilities associate with users for enabling these users to communicate via the mentioned service. This computer program comprises code means which when run on a computer of the second UE causes the computer to: receive a service capabilities exchange invitation, requesting an exchange of service capabilities associated with the two users, wherein the invitation is received from the first UE via a second signaling protocol other than a first signaling protocol previously applied by the first UE when unsuccessfully requesting an exchange of service capabilities associated with the users of the two UEs and when a first user, being a user of the first UE, is not authorized to access the service capabilities associated with a second user, being a user of the second UE; present options allowing the second user to accept or reject the requested service capabilities exchange, in case the second UE is capable of interpreting the service capabilities exchange invitation as a request for exchanging service capabilities, or present a message contained in the service capabilities exchange invitation, in case the second UE is not capable of interpreting the service capabilities exchange invitation as a request for exchanging service capabilities.

According to an eighth aspect a first UE, capable of communicating with a second UE and of applying a service which require exchange of service capabilities between users for enabling these users to communicate via the mentioned service, is provided which comprise: a first requesting module for providing, via a first signaling protocol, a service capabilities request, requesting an exchange of service capabilities associated with the users of the two UEs, to the second UE, when a first user, being a user of the first UE, is not authorized to access the service capabilities associated with a second user, being a user of the second UE; a first identifying module for identifying a response to the service capabilities request, received from the second UE, as a rejection to the service capabilities request; a second requesting module for providing a service capabilities exchange invitation via a signaling protocol other than the first signaling protocol, the invitation being configured to request an exchange of service capabilities exchange associated with the two users; a second identifying module for identifying the second user as a user with which the first user cannot communicate via said UEs and the mentioned service, in case the service capabilities exchange invitation does not result in the requested service capabilities, or for identifying the second user as a user with which the first user can now communicate via the two UEs and the mentioned service, in case the service capabilities exchange invitation results in the requested exchange of service capabilities.

According a ninth aspect, a second UE, capable of communicating with a first UE, such as the one mentioned above, and of applying a service which requires exchange of service capabilities associated with users for enabling these users to communicate via the mentioned service, is provided. The second UE comprise: a second receiving module for receiving a service capabilities exchange invitation from the first UE via a second signaling protocol other than a first signaling protocol, previously applied by the first UE when unsuccessfully requesting an exchange of service capabilities associated with the users of said UEs from a first receiving module of the second UE, the invitation being an invitation requesting an exchange of service capabilities associated with the two users, when a first user, being the user of the first UE, is not authorized to access the service capabilities associated with a second user, being the user of the second UE, and a presenting module for presenting the service capabilities exchange invitation to a user of the second UE, such that this user is provided with the options of accepting or rejecting the requested service capabilities exchange, in case the second UE is capable of interpreting the service capabilities exchange invitation as a request for exchanging service capabilities, or for presenting a message contained in the service capabilities exchange invitation, in case the second UE is not capable of interpreting the service capabilities exchange invitation as a request for exchanging service capabilities.

BRIEF DESCRIPTION OF DRAWINGS

Embodiments will now be described in more detail in relation to the accompanying drawings, in which.

DETAILED DESCRIPTION

Figure 1:
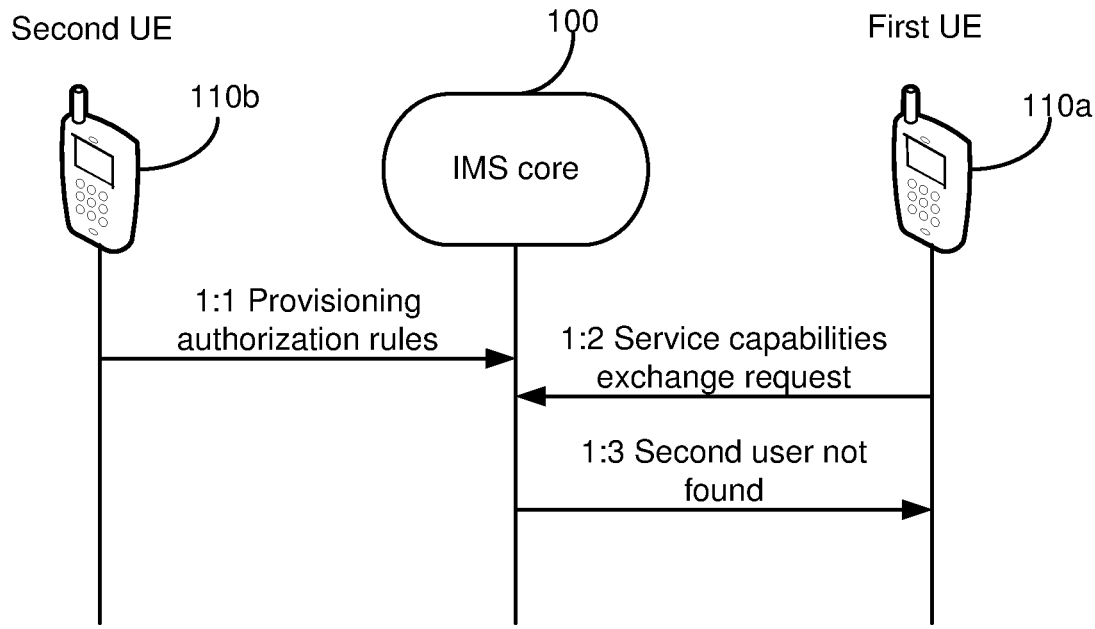
FIG. 1 is a signalling scheme illustrating a scenario when a request for service capabilities exchange fails, according to the prior art.

Briefly described, this document address the problem of the non-existence of any mechanism for automatically allowing a user, A of a specific service, such as e.g. an RCS related service, or any other service which require service capabilities exchange between two involved UEs, to discover service capabilities of another user, B, and thus to prepare for subsequent use of such a service between the two UEs when this other user B is applying a restrictive privacy policy towards user A.

More specifically, the present document refer to methods for executing a service capabilities exchange process involving two UEs, such that after a successful service capabilities exchange process the two UEs will be able to communicate via a service associated with the exchanged service capabilities also in situations where a responding user has initially not authorized the other user to be allowed to access the requested service capabilities. UEs for executing the suggested methods are also suggested. As a pre-requisite it is assumed that the suggested methods are executed via a network having a privacy framework which provides for service capabilities exchange, such that only authorized users are allowed to access service capabilities information of another user. Privacy frameworks, as such, as well as the operation thereof are commonly known to the skilled person and will therefore not be discussed in any further detail in this disclosure.

Even though the given examples explicitly refer to RCS services, it is also to be understood that the methods and UEs described herein are not restricted to be applicable only to this specific type of services but that the suggested methods and UEs are applicable for any type of service for which there is a requirement that service capabilities are exchanged between the involved UEs, before communication between the UEs via a relevant service can be established.

More specifically, a mechanism, such as the one suggested above, will now be described below, with reference to FIG. 2. In resemblance with FIG. 1, FIGS. 2, 3 and 4 refers to an IMS core 100, which is to be interpreted as comprising any type of IMS core network infrastructure, which is capable of providing at least one service which require service capabilities exchange before service execution can commence, and consequently, the IMS core is also capable of executing such a service capabilities exchange. Details for how such procedures can be executed in an IMS core are well known to the person skilled in the art, and, thus, further details on these aspects are therefore left out of this disclosure. While the given example is referring to an IMS core, it is, however, to be understood that the described mechanism is applicable to UEs capable of accessing any type of core network, where a corresponding exchange of service capabilities is required for allowing the respective UEs to communicate with each other via a certain service, and where such an exchange can be executed.

Figure 2:
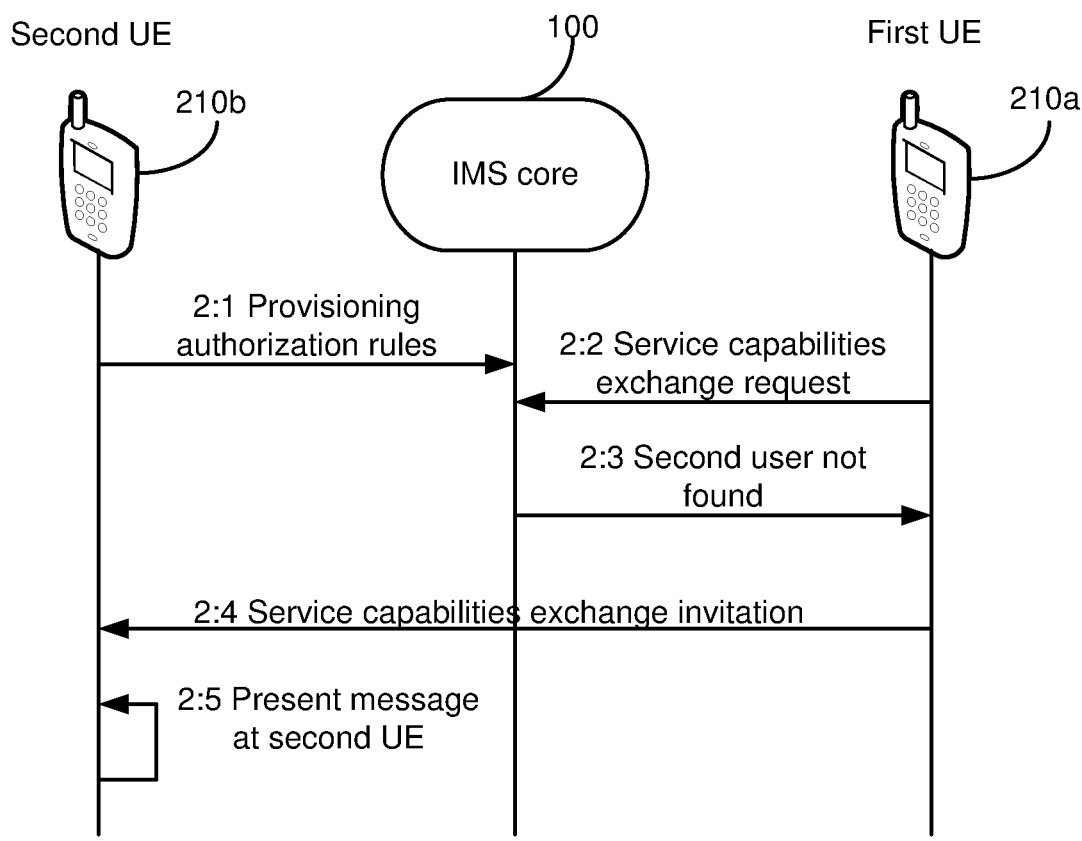
FIG. 2 is a signalling scheme illustrating, in a first scenario, how service capabilities exchange can be executed according to one embodiment.

As indicated in FIG. 2, a second user initiates provisioning of his authorization rules by connecting to the IMS core 100, via a second UE 210b, according to a first step 2:1. This step, as well as the corresponding first steps of FIGS. 3 and 4, as will be described below, includes authorization of at least one other user to access service capabilities of the second user, but no authorization of a user of first UE 210a, to access the same service capabilities.

In a next step 2:2, which may be executed at any time subsequent to step 2:1, i.e. in the absence of an authorization of the first user by the second user with respect to the requested service capabilities, the first user initiates a service capabilities exchange attempt with the second user, by providing a request to the IMS core 100, i.e. the IMS core 100 is handling such a request on behalf of the second user. The exchange can also be described as requesting an exchange of service capabilities associated with the two users. From hereinafter, such an exchange is to be construed as service capabilities of one or more UEs to which a first user is registered are made available to a second user, and vice versa.

Exchange of service capabilities can be triggered in a number of different ways. A first time registration may be applied in order to obtain a present registration state and a default set of service capabilities for the IMS identity of each contact of a specific user. Alternatively, a service capabilities exchange may be initiated each time a new contact is added to the user. Triggering may also be initiated on a periodical basis, so that all contacts of the user, whose service capabilities are not available to the user, are periodically requested. According to another alternative, an exchange may be triggered when a contacts primary MSISDN is modified, or a when a new MSISDN is added. Triggering of an exchange may also be initiated upon checking availability of one more services, such as e.g. RCS, e.g. by interrogating the address book and the call-log. More specifically, depending on configuration and/or present situation, the method as described in step 2:2 and the following steps, as well as in the corresponding scenarios described below with reference to any of FIG. 3 or 4, may be executed once or repeated for each contact relevant for the respective scenario.

Since, the first user is not authorized to access the requested service capabilities, the request of step 2:2 will result in a response from IMS core 100 to the first UE that the second user is not found as an address book contact, as indicated in a next step 2:3. The response is presented to the first user, typically as a message which is visually displayed to the first user on a display of the first UE 201a. Alternatively, the first user is presented with the response in another way, allowed by the applied user interface.

Steps 2:1-2:3 are typically executed in accordance with the corresponding steps 1:1-1:3 of FIG. 1 and are, thus, not described in any further detail herein.

However, instead of terminating the process at this stage, in response to the negative indication from the IMS core 100, as was the case in the corresponding scenario described above with reference to FIG. 1, the first UE 210a continues by initiating a new message type, which from hereinafter will be referred to as service capabilities exchange invitation. Alternatively, such a message type may be referred to as a second service capabilities exchange request or a service discovery invitation. The suggested new message, which is here automatically generated and sent to the second UE 210b in another step 2:4, is provided by the first UE 201a to the second UE 210B as a message that, under certain circumstances, can be recognized and interpreted by the second UE 210b as a service capabilities exchange request which is to be considered, even though the user of the first UE 201a is not yet authorized to access the service capabilities requested in step 2:2 More specifically, the second UE may be a UE which is configured to interpret and present the mentioned invitation as such and accordingly to perform steps, as will be described in further detail below, which allow the requested service capabilities exchange to be successfully completed. In case the UE is not configured to interpret such an invitation as a request for service capabilities exchange, i.e. the UE is any type of conventional UE which has not been specifically adapted as suggested in this document, the UE will still be capable of presenting any information as inserted into and sent in the invitation. In the latter case no service capabilities exchange will be executed, but the presented information may comprise information to the user of the second UE which in one way or the other may inform that user of one or more specific services and may even promote later successful service capabilities exchange and consequently also later use of a specific service or group of services, which depend on such service capabilities exchange for being operable between the first and the second UE.

Accordingly, the invitation sent in step 2:4 triggers a presentation of content at the second UE 210b, where the presented content is content which has been predefined at the second UE 210b in the former case, or content which is contained in the invitation at the second UE 210b in the latter case. This is achieved by applying a signalling protocol for the service capabilities exchange invitation which differs from the protocol used for transmitting the service capabilities exchange request in such a way that it is not affected by any of the authorization rules of the second user to which the request and invitation applies.

Short Message Service (SMS) is one signaling protocol which can be used for such a purpose, while Multimedia Messaging Service (MMS) is another usable protocol, which can be used for forwarding the suggested invitation to the second user irrespective of whether or not the second user has authorized the first user to access its service capabilities. SMS over IP may alternatively be applied for transportation of the invitation. More information on use of any of the suggested signaling protocols can be obtained in 3GPP TS 23.040 "Technical realization of the Short Message Service (SMS), 3GPP TS 23.140 "Multimedia Messaging Service (MMS); Functional description" or 3GPP TS 24.341, "Support of SMS over IP networks", respectively, and particularly section 5.3.1-5.3.2.

By using a suitable signaling protocol, the second user will be provided with a message which it can interpret, present and process, or only present, depending on the circumstances, even though it is received from a user which has not yet been authorized to access service capabilities of the requester.

Such a presentation is illustrated with a final step 2:5 in FIG. 2. More specifically, step 2:5 may result in a message being presented to the second user e.g. via a display of the second UE 210*b*, to the second user, presenting a human perceptible message, such as e.g. a text message, in case of an SMS or as a part of an MMS.

In the present scenario it is assumed that the second user is not a user of the requested service, and, as a consequence, the requested service capabilities exchange cannot be executed and consequently the described process terminates at this stage, but even though the second user cannot proceed by selecting to continue to communicate with the first UE, via the second UE, the second UE may still be able to at least obtain information on a service related to the requested service capabilities, e.g. by being presented with a selectable option which may e.g. be accessible via a provided link, e.g. as suggested above. In such a situation, instead of initiating exchange of service capabilities, the suggested mechanism can be used for the additional purpose of promoting a certain service also for presently non-service enabled UEs.

Such a message, which is presented on the second UE as a normal SMS, or as a normal MMS, in case an SMS or MMS is used, respectively, for the invitation, may e.g. be phrased as:

"First user is inviting you to use communication service A. By way of example, in case the suggested method is applied for RCS services, communication service A may e.g. be Joyn™. Please go to the enclosed link to find more information on this service: http:/communication_service_A.bestprovider.com"

Which message to provide in the invitation and present at the second UE is typically determined and predefined by the operator, and, thus, dependent on the type of trigger which originally initiated the generation and transmission of the invitation, different predefined messages may be automatically attached to the invitation.

Figure 3:
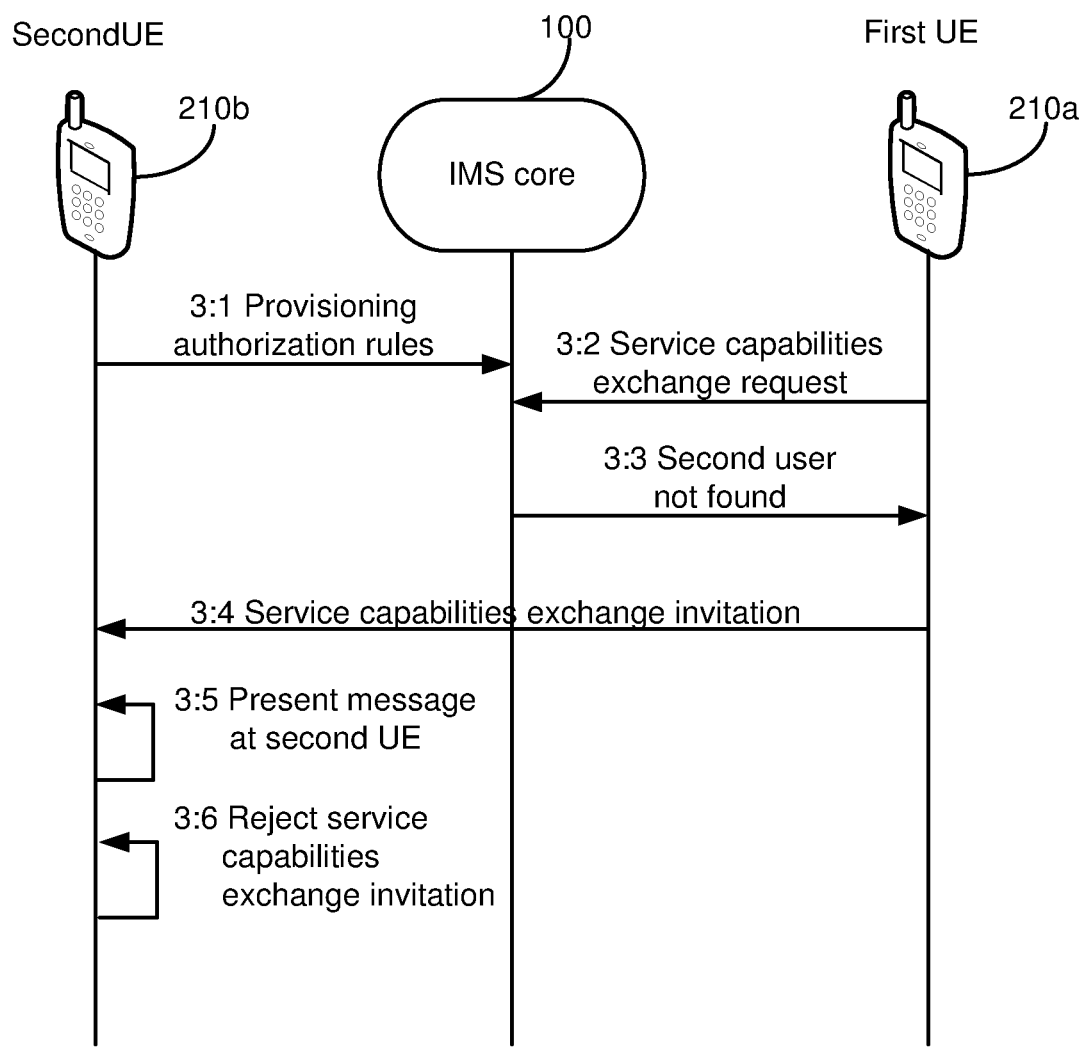
FIG. 3 is a signalling scheme illustrating, in a second scenario, how service capabilities exchange can be executed according to the embodiment initiated according to FIG. 2.

Another scenario will now be described with reference to FIG. 3, where steps 3:1 to 3:5 correspond to steps 2:1 to 2:5 respectively, but where the second UE is instead configured to interpret content of the invitation accordingly. More specifically an associated client run on the UE used by that user is configured to interpret content of the invitation. In the present scenario the second user may e.g. be an RCS user, wherein an RCS agent running on the UE recognises the invitation as a request for a service capabilities exchange. In step 3:5, the second user is presented with a message generated at the second UE, rather than a message sent in the invitation, prompting the second user to respond to the presented invitation by either accepting or rejecting a service capabilities exchange via the user interface of the second UE 210*b*, such as e.g. a keyboard or touchscreen, of the second UE 210*b*. Handling of such an input is indicated with step 3:6 in FIG. 3. In the present scenario, the message may e.g. be presented as: "Do you want to accept the first user as one of your contact friends?". By accepting such a request the user also accepts the requested service capabilities exchange to take place.

As indicated above, the option of accepting or rejecting a requested service capabilities request, provided in the mentioned invitation, may typically be presented to the second user as a request to accept or reject the first requesting user in his community, and the ability to interpret such a request, as well as the content of the message presented to the responding user, will depend on the service presently activated on the second UE, i.e. on the service agent presently running on the second UE.

In the present case the invitation is rejected by the second user and, as a consequence the process is terminated at that stage, again without any service capabilities exchange taking place.

Yet another scenario will now be described with reference to FIG. 4, where steps 4:1-4:5 correspond to steps 2:1-2:5 and 3:1-3:5, respectively, i.e. also in this case the received invitation triggers the generation and presentation of a message similar to the one generated and presented in step 3:5 of FIG. 3. However, in this scenario the second user accepts the generated and presented invitation, which results in a response being generated and provided to the first UE 210*a*, as indicated with step 4:6. In another step 4:7 relevant authorization rules of the second user are updated by the second user, such that the first user is now being authorized to access the requested service capabilities of the second user, and in yet another step 4:8 the corresponding authorization rules of the first user are updated by the first user, such that the second user is now authorized to access the corresponding service capabilities of the first user, i.e. if referring to the example mentioned above, the first user is now accepted as a Joyn™ friend of the second user. After acceptance, a service capabilities exchange process between the second UE 201*b* and the first UE 210*a* is initiated at the second UE 210*b*, as indicated with a step 4:9 and accordingly a subsequent service capabilities exchange process is executed and completed between the two UEs as indicated with a final step 4:10.

Figure 4:
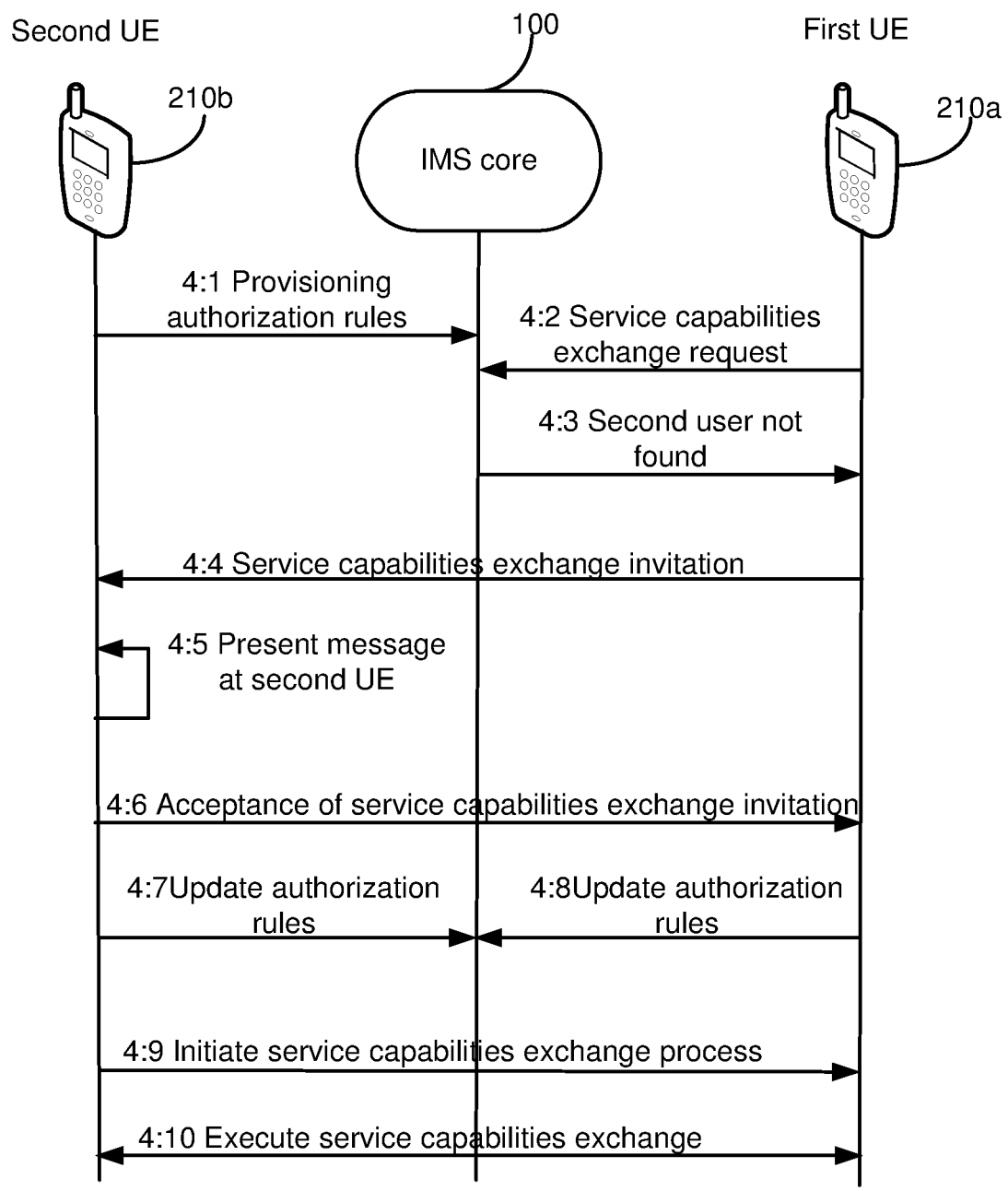
FIG. 4 is a signalling scheme illustrating, in a third scenario, how service capabilities exchange can be executed according to the embodiment initiated according to FIG. 2.

It is here to be understood that even though steps 4:7 and 4:8 are given in a specific order in FIG. 4, both these steps can alternatively be executed in another order as long as step 4:7 is executed subsequent to step 4:2, i.e. after an initial request for a service capabilities exchange resulting in a negative response to the first UE has been initiated, and before execution of step 4:10, i.e. before service capabilities are exchanged between the two UEs. As for step 4:8 this step need to have been executed before step 4:10 can commence, or else step 4:10 will fail. In a typical scenario, step 4:8 may be executed already in association with initiating step 4:2.

A method as executed in a UE, above referred to as a first UE, capable of requesting service capabilities associated with a second user of a second UE, as described above, will now be described in further detail with reference to FIG. 5.

As already mentioned above, the first user can authorize the requested user, i.e. the second user, to access its service capabilities at any time before a requested service capabilities exchange is executed. In FIG. 5 this is done as a first step, in association with determining to provide a service capabilities exchange request to the second UE, as indicated in step 5:1 and 5:2, respectively. In another step 5:3, a response to the service capabilities exchange request is identified at the first UE, and the two alternative options are illustrated in conditional step 5:4.

If the response received in step 5:3 is not a rejection to the request any other on-going process (not shown) continues on the first UE in a conventional manner. If, however, the response indicates a rejection, the suggested method continues by generating a service capabilities exchange invitation, and by providing such an invitation to the second UE, as indicated with step 5:5. Typically this request is generated automatically at the first UE, but optionally, the user could at this stage be prompted with an option to stop the process here, or to continue as suggested in FIG. 5, i.e. by selecting to trigger the providing of a service capabilities exchange invitation to the second UE. The transmission of such a second message may, as indicated with step 5:6, result in that no response to the invitation is received from the second UE, i.e. the invitation does not result in any service capabilities exchange, and the described method is terminated and, as a result the first user will also in the future not be able to communicate via any service which require service capabilities exchange, as indicated in step 5:11.

If, however, the transmission of the service capabilities exchange invitation results in a service capabilities exchange process, i.e. the first UE is experiencing a service capabilities exchange process initiated by the second UE, in response to providing the service capabilities exchange invitation to the second UE, the user of the second UE is thereby identified as a potential user of a certain service or group of service, as indicated with a subsequent step 5:7, while an executed service capabilities exchange is illustrated by another step 5:8. Typically, such a capabilities exchange process continues by the first UE storing the retrieved service capabilities, as indicated with step 5:9, and by executing an associated service, which can now be done thanks to the retrieval of the required service capabilities, as indicated with a final step 5:10. By automatically applying a service capabilities exchange invitation in response to identifying a rejection to a service capabilities request, a larger amount of this type of requests will be able to reach the respondent, without requiring any further interaction from the user initiating such a request, rather than resulting in premature termination, as indicated above, with reference to FIG. 1. As already mentioned above the described method may, depending on configuration and situation, be triggered either for requesting service capabilities associated with one specific user or a group of users, where, in the latter case, a process as described in FIG. 5 may be repeated for each of a plurality of identified users or even all users registered in the address book of the first user.

A corresponding method executable on a UE of a user capable of receiving an invitation as suggested above, herein referred to as a second UE, will now be described in further detail with reference to FIG. 6.

Figure 6:
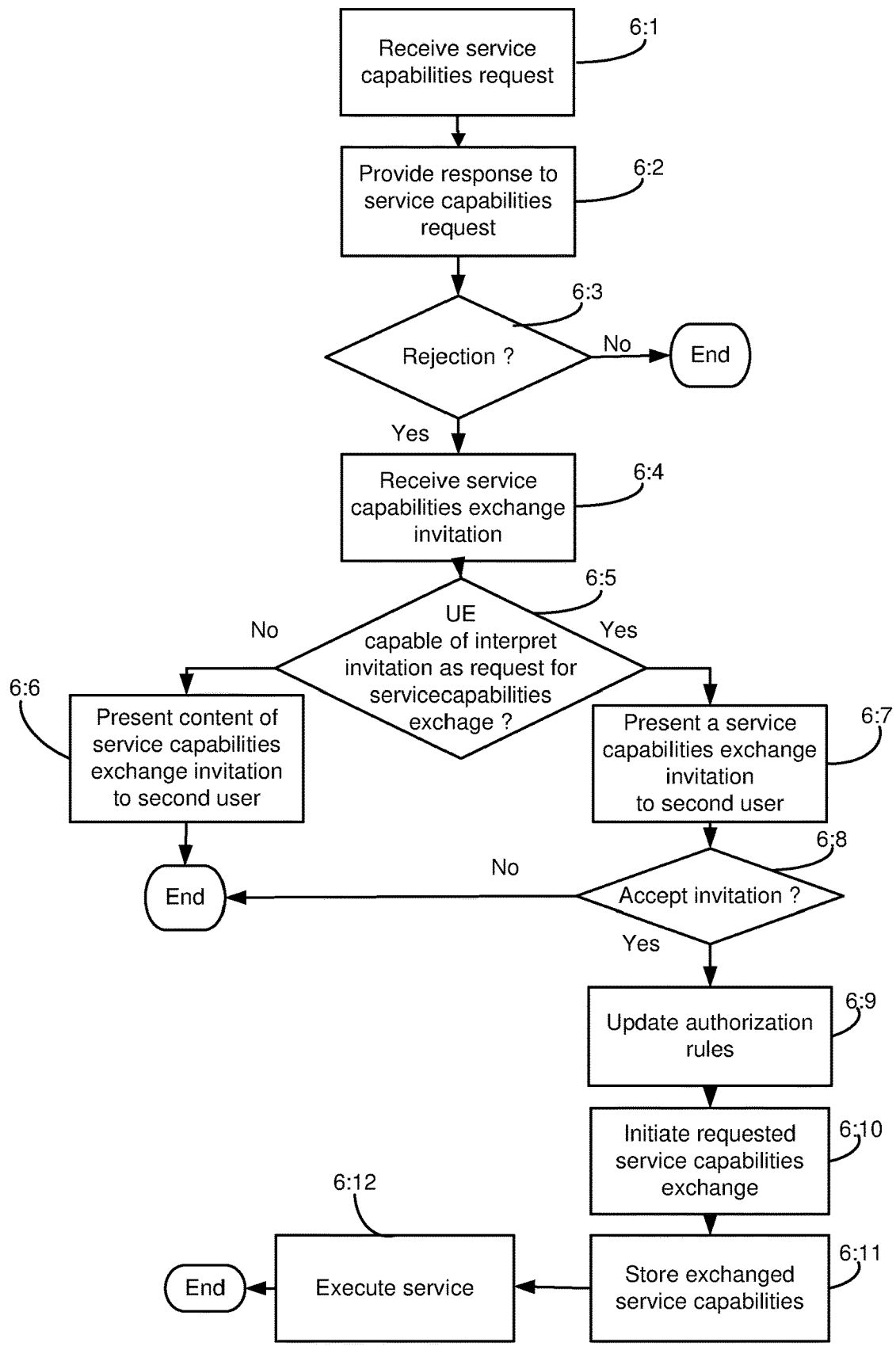
FIG. 6 is another flow chart illustrating how a service capabilities exchange process can be executed at a UE responding to a request for such a process, according to a first embodiment.

As indicated in FIG. 6, a first service capabilities request provided to the second UE from a first UE resulting in a rejection, as indicated with steps 6:1-6:3 continues by handling a received service capabilities exchange invitation, as will be further described below. The suggested method is continued by the second UE receiving a service capabilities exchange invitation, which differs from a service capabilities request as already mentioned above. Reception of such an invitation is indicated with step 6:4, and, as indicated in another step 6:5, it is determined whether or not the second UE is capable of interpreting the received invitation as a request for service capabilities exchange. In case the agent, or the service presently running or executed on the second UE is not enabled to interpret the received invitation as a request for a service capabilities exchange, content of the invitation will be presented to the second user, as indicated in step 6:6. As already mentioned above, such a message may comprise a link to further information related to one or more services. Consequently, the second UE will in any event be able to present some information associated with the request to the user of the second UE, if that UE is capable of receiving and interpreting the message format used for the invitation, while in case only a conventional service capabilities request could be received and identified by the second UE, no information whatsoever would have been presented to the user if the originating user from which the request was sent had not already been authorized to access the service capabilities of the second user.

As already mentioned above, a message indicating a specific service which is accessible by the first user, or which in any other way refer to a specific service or a group of services may be presented to the user of the second UE, e.g. as a text message. Possibly the text message could comprise further information about the service, and possibly also a link to such further information. Alternatively, the message may be provided as an audio message, in case the message format used provides for such an option, or as a combination of text and audio. As already mentioned above a condition of the invitation used is that it is sent via a signalling protocol other than the one used for the previously sent service capabilities request, such that it will be able to reach the intended recipient also under the circumstances as described herein.

In case the agent or service running or executed on the second UE is instead capable of interpreting the invitation as a service capabilities exchange request, the method instead continues with steps 6:7 and 6:8, where the invitation is interpreted by the second UE as a request for a service capabilities exchange, and thus triggers a presentation to the second user of options of either rejecting or accepting the invitation. In the former case the method is terminated, while in the latter case the process continues by updating the authorization rules, such that the first user is allowed to access the relevant service capabilities of the second user, as indicated with step 6:9. In another step 6:10 following the acceptance of the invitation by the second user, a service capabilities exchange with the first UE is initiated by the second UE. This step is indicated as a step which is executed unconditionally and automatically following an acceptance of the invitation by the second user.

Once a service capabilities exchange has been executed and successfully completed, so that the first user and the second user now have access to the service capabilities associated with other parties respective UE, the exchanged service capabilities associated with the first user are typically also stored by the second UE, as indicated with step 6:11 and any service for which the executed service capabilities exchange is required can now be executed, as indicated with step 6:12.

It is to be understood, that the suggested feature for allowing a requesting user which has not been authorized by the responding user to request for service capabilities may actually be unwanted by the responding user, and therefore an option to enable or disable this feature may be provided, where in case of disabling the suggested feature, invitations received by the second UE will be ignored, i.e. not even presented to the second user, and thus, in such a situation the UE will operate according to the prior art embodiment as described above with reference to FIG. 1.

A UE, herein referred to as a first UE, which is capable of executing the method as described above with reference to FIG. 5 will now be described in further detail with reference to FIG. 7.

Figure 7:
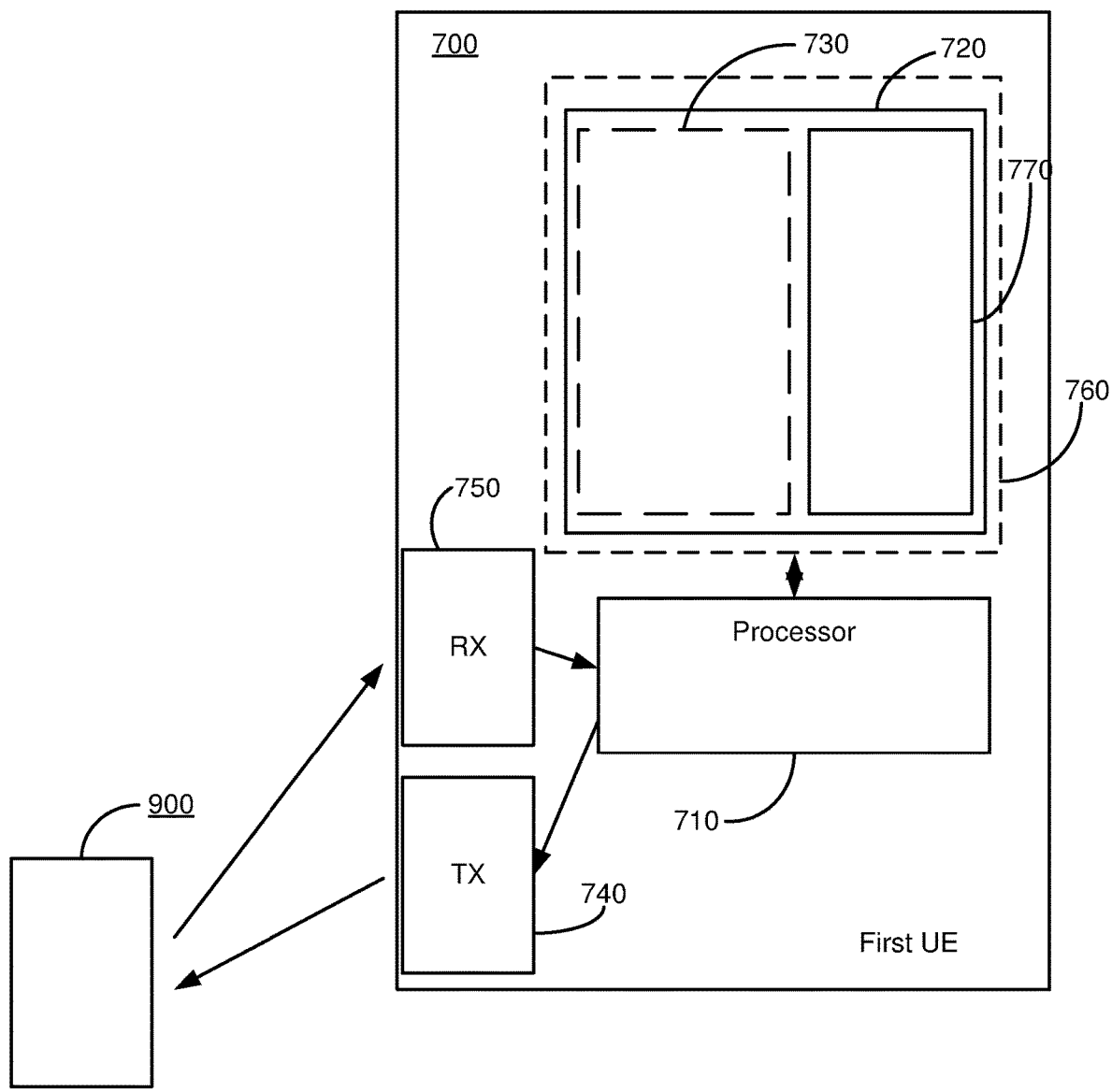
FIG. 7, is a block scheme illustrating a first UE according to one embodiment.

The first UE 700 of FIG. 7 comprise one or more processors, here represented by processor 710, and a memory 720, storing instructions 730, or program code, which when executed by the processor 710 causes the first UE 700 to execute the method as described above with reference to FIG. 5. The processor 710 may be a single CPU (Central processing unit), or could alternatively comprise two or more processing units. For example, the processor 710 may include one or more general purpose microprocessors, instruction set processors and/or related chips sets and/or special purpose microprocessors, such as e.g. at least one ASIC (Application Specific Integrated Circuit), Digital Signal Processor (DSP) or general purpose computer. The first UE 700 also comprises a transmitter (TX) 740, and a receiver (RX) 750, allowing the first UE 700, to communicate with other UEs, here represented by a second UE 900, via a communication protocol for which the two UEs have been configured.

More specifically, the first UE 700 is capable of exchanging service capabilities associated with a first user of the first UE and a second user of the second UE the first UE also being capable of applying a service which require exchange of service capabilities between users before the two users can communicate via the mentioned service, via the two UEs. The memory 720 comprise instructions which when executed by the processor 710 causes the first UE 700 to: provide a service capabilities request via a first signaling protocol, where the service capabilities request is requesting an exchange of service capabilities associated with the users of the two UEs in a situation when the first user is not authorized to access the service capabilities associated with the second user; identify a response to the service capabilities request, received by the first UE 700, as a rejection to the service capabilities request; provide a service capabilities exchange invitation, requesting an exchange of service capabilities associated with the two users, to the second UE 900, via a second signaling protocol which is a protocol other than the first signaling protocol; identify the second user as a user with which the first user cannot communicate via said UEs and said service, in case the service capabilities exchange invitation does not result in the requested exchange of service capabilities, or identify the second user as a user with which the first user can now communicate via the two UEs and the mentioned service, in case the service capabilities exchange invitation results in the requested exchange of service capabilities.

The memory 720 typically also comprises persistent storage 770, which, for example, can be any single one or combination of magnetic memory, optical memory, solid state memory or even remotely mounted memory, capable of storing data.

The memory 720 may further comprise instructions which when executed by the processor 710 causes the first UE 700 to store the exchanged service capabilities associated with the second user. Instructions may also cause the first UE 700 to execute the mentioned service, including also the second UE 900, at least partly based on the exchanged service capabilities, in case that service is initiated by any of the users.

Instructions of the first UE 700 may be configured so that the second UE 700 can apply a signaling protocol other than the first signaling protocol, where the applied signaling protocol is a signaling protocol which is not affected by any authorization rules of the second user that relates to the mentioned service, i.e. the suggested protocol can be used for reaching the second UE even though the first user has not been authorized by the second user to access service capabilities. Instructions may also be configured such that the first UE 700 is capable of providing the suggested new service capabilities exchange invitation with a text message, where such text typically will depend on the operator, such that it e.g. may comprise information which relates to the mentioned service. More specifically, by being able to attach an appropriate text message, possibly together with a link, linking to further information, also a UE which is not able to interpret the invitation as service capabilities request will be able to at least provide some information relating to the request to the second user.

Instructions may either be configured so that the first UE 700 automatically generates a service capabilities exchange invitation upon identifying the response to the service capabilities exchange request as a rejection of the request, or, in case use of the suggested invitation is manually selectable, so that the invitation is generated upon identifying the response to the service capabilities exchange request as a rejection of the request, and upon recognizing user consent of applying the invitation. Typically such user content is requested by displaying options of accepting or rejecting use of an invitation on the user interface of the first UE 700.

The instructions suggested above may be provided as a computer program comprising computer readable code units, which computer program may be provided as, or form part of a computer program product. In FIG. 7, computer program product 760 comprises storable means which is accessible by processor 710, which is capable of operating as a computer. Such a computer program product 760 may be arranged e.g. in the form of a non-volatile memory, such as e.g. an Electrical Erasable Programmable Read-Only Memory (EEPROM) a flash memory, a Random Access Memory (RAM), or a disc drive. In the latter case, the instructions 730 are typically arranged on a disc rather than on a memory, or on any other means capable of carrying computer readable instructions 730.

Alternatively, instructions may also allow the first user to start a timer when the invitation is sent to the second UE, such that when a predetermined timer interval has lapsed without receiving any requested service capabilities, the process is terminated, e.g. by displaying a message that no service capabilities have been received to the second user.

Figure 5:
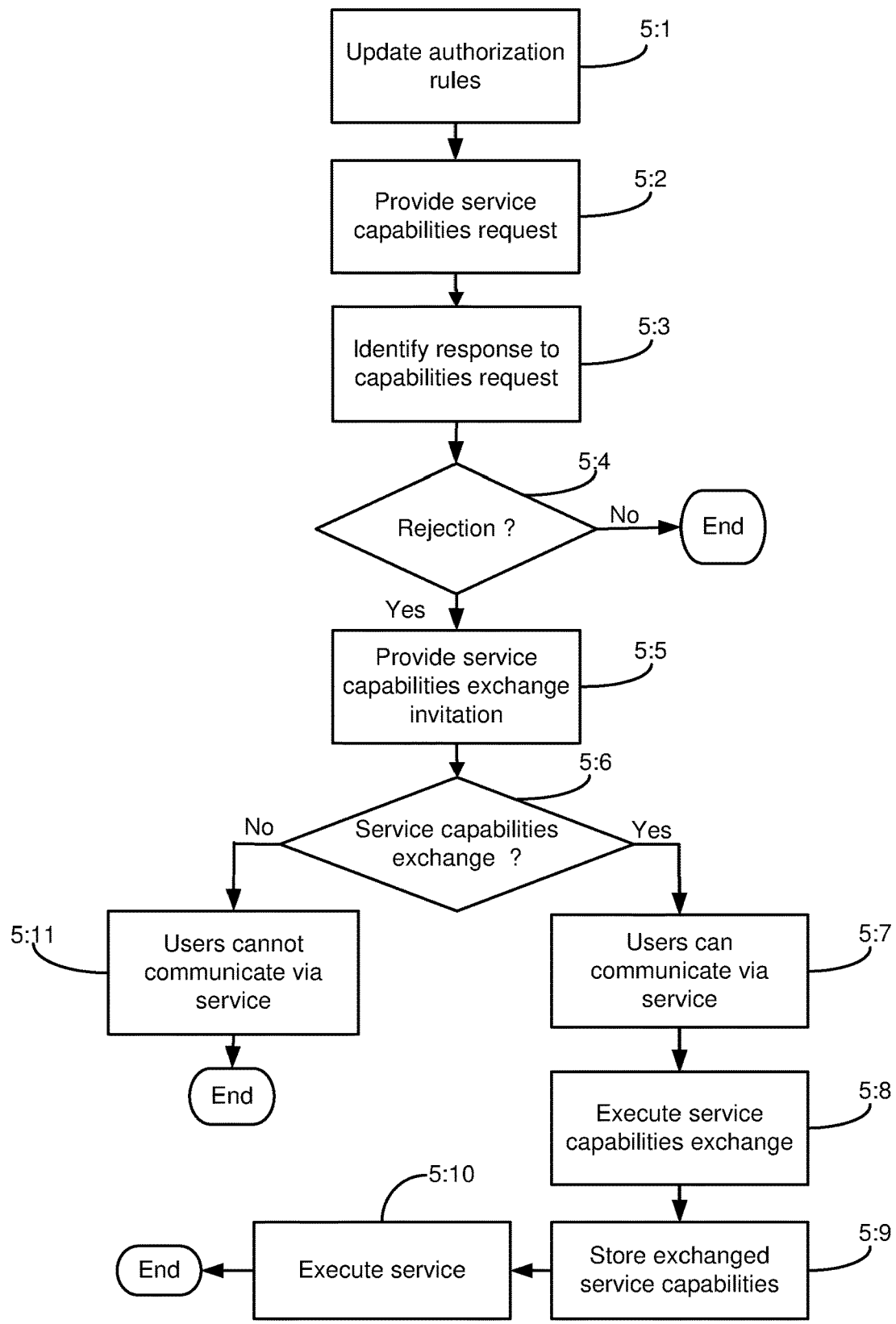
FIG. 5 is a flow chart illustrating how a service capabilities exchange process can be initiated and executed at a UE from which such a process is initiated, according to a first embodiment.
Figure 8:
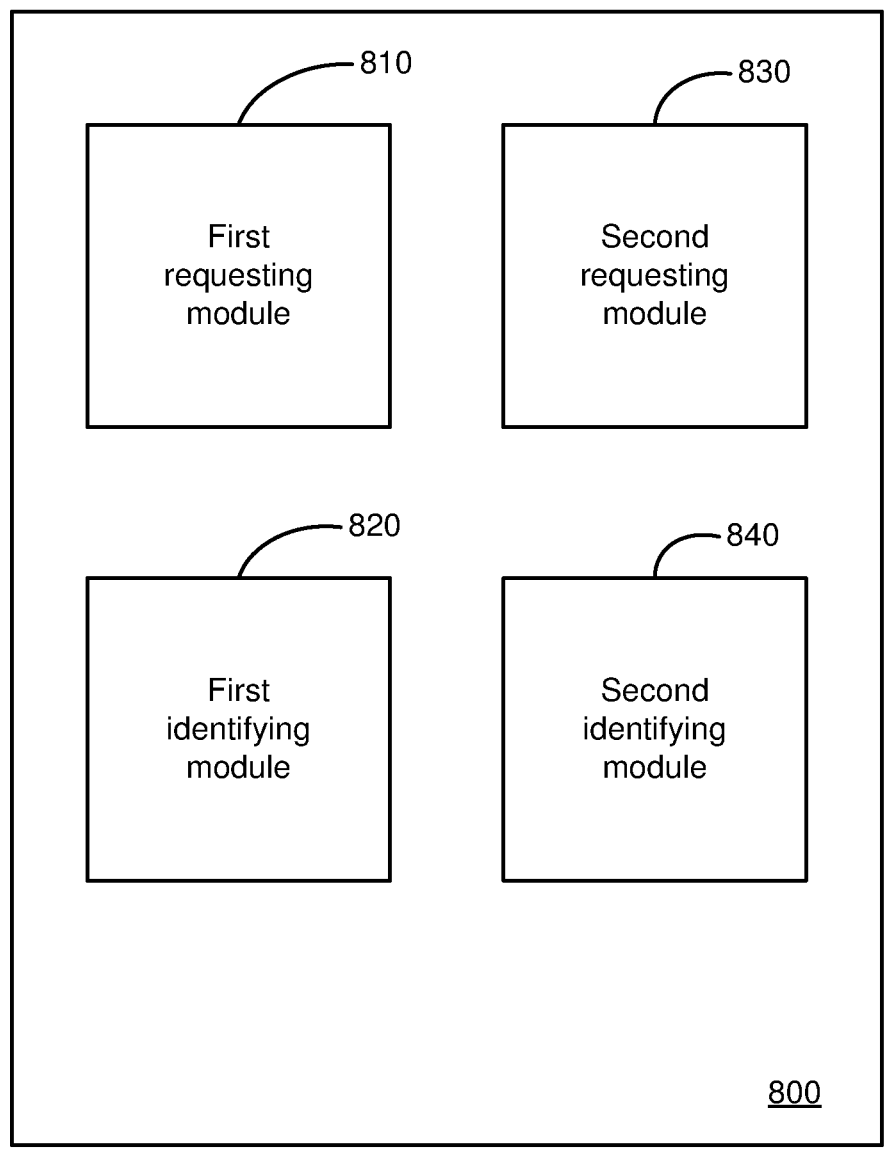
FIG. 8 is illustrating a configuration of the first UE according to one embodiment.

According to an alternative embodiment, the first UE 700 is instead described as comprising a plurality of modules which are capable of interacting with each other, so that the method of FIG. 5 can be executed. One such configuration or arrangement is illustrated in FIG. 8 which describe a plurality of interacting means or modules 810-840 which may either be arranged as software modules, wherein the arrangement 800 could constitute an illustration of the instructions 730 as described above with reference to FIG. 7, or a part thereof. Alternatively, the means or modules 810-840 may be arranged e.g. as Programmable Logic Devices (PLDs) or as any other type of hardware configuration which is capable of providing the suggested functionality. In the latter case the arrangement 800 could constitute an illustration of the processor 710 as described above with reference to FIG. 7, or a part thereof. It is also to be understood that the means or modules 810-840 may be configured as a combination of hardware and software implemented modules which are configured to interact with each other, as described herein.

More specifically, the arrangement 800 of FIG. 8 disclose a first requesting module 810 for providing a service capabilities request via a first signalling protocol corresponding to step 5:2 of FIG. 5; a first identifying module 820, for identifying a response to the service capabilities request, corresponding to steps 5:3 and 5:4 in FIG. 5; a second requesting module 830 for providing a service capabilities exchange invitation via a signalling protocol other than the first signalling protocol, corresponding to step 5:5 in FIG. 5, and a second identifying module 840 for identifying the second user, either as a user with which the first user can or cannot communicate via the mentioned UEs and service, depending on whether or not the second UE is capable of interpreting the invitation as a request for service capabilities, and in case it is capable of doing that, whether or not the invitation results in a service capabilities exchange, corresponding to steps 5:7 and 5:8 or 5:11, respectively of FIG. 5. In case use of the suggested invitation is optional, e.g. the first identifying module 820 may be configured such that the first user is prompted via a user interface (not shown) with a question of whether or not an invitation should be provided.

The second requesting module 830 may further be configured such that an operator, or any other party authorized to determine what information that should be carried in the invitation, can edit such a text, as well as any link and associated information, via any suitable user interface (not shown) if required. Alternatively, the second requesting module also comprises a timer functionality, which is operable as suggested above, with reference to FIG. 7.

Another UE, herein referred to as a second UE, which is capable of communicating with a UE, such as e.g. the first UE as described above with reference to FIGS. 7 and 8, and of executing the method as described above with reference to FIG. 6 will now be described in further detail with reference to FIG. 9. It is to be understood that the first UE, as described above with reference to FIGS. 7 and 8, and the second UE, as described below with reference to FIGS. 9 and 10, may be any type of stationary or mobile UE, such as e.g. a Personal Computer (PC), a Set Top Box (STB), a Lap Top, a cellular phone, typically a smart phone, or any other type of UE which is capable of interacting as described herein.

Figure 9:
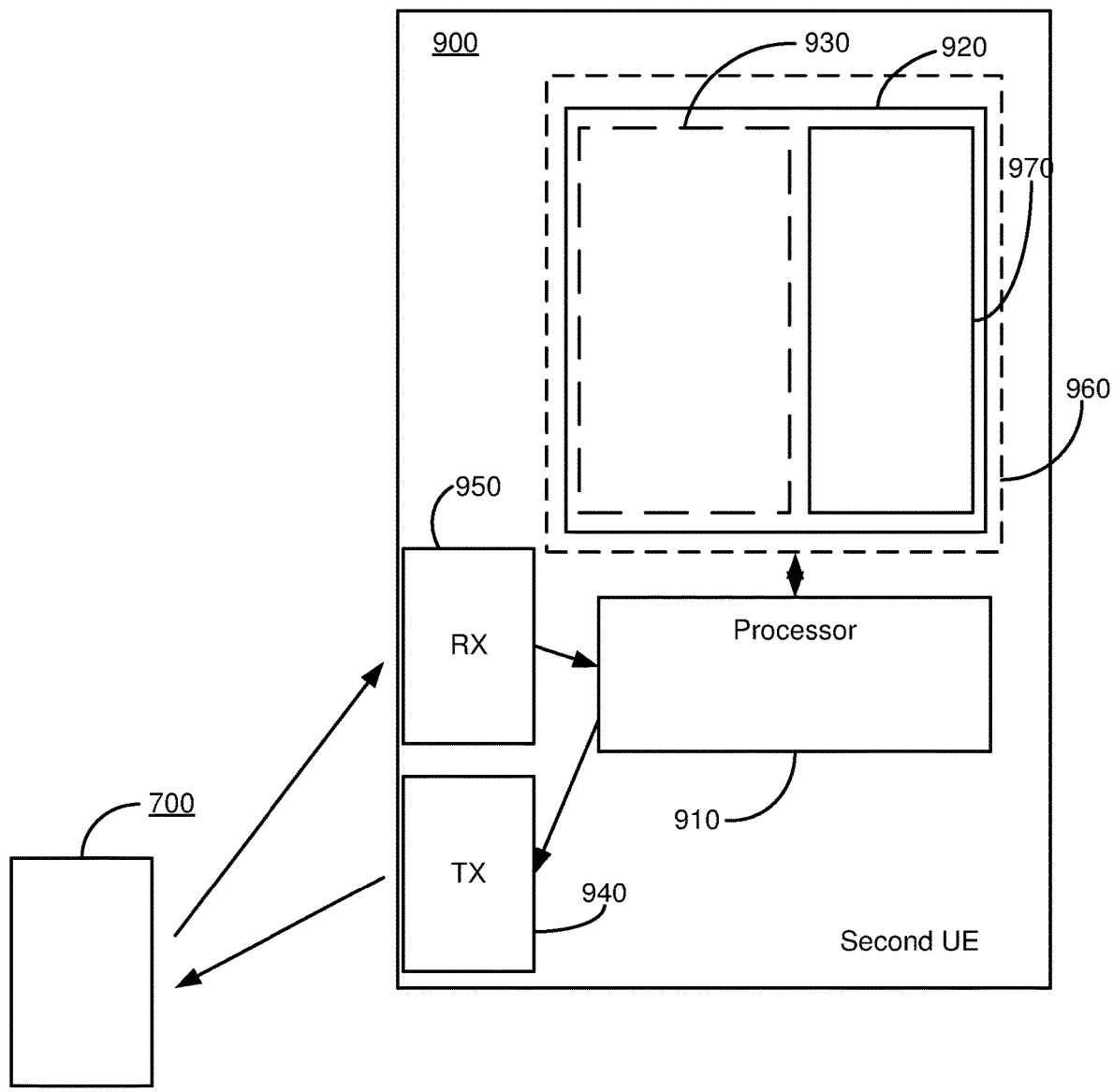
FIG. 9 is a block scheme illustrating a second UE according to one embodiment.

The second UE 900 of FIG. 9 comprise one or more processors, here represented by processor 910, and a memory 920, storing instructions 930, or program code, which when executed by the processor 910 causes the second UE 900 to execute the method as described above with reference to FIG. 6. The processor 910 may be a single CPU (Central processing unit), or could alternatively comprise two or more processing units. For example, the processor 910 may include one or more general purpose microprocessors, instruction set processors and/or related chips sets and/or special purpose microprocessors, such as e.g. at least one ASIC (Application Specific Integrated Circuit), Digital Signal Processor (DSP) or general purpose computer. The second UE 900 also comprises a transmitter (TX) 940, and a receiver (RX) 950, allowing the second UE 900, to communicate with other UEs, here represented by a first UE 700, as described above with reference to FIG. 7, via a communication protocol for which the two UEs have been configured.

The memory 920 typically also comprises persistent storage 970, which, for example, can be any single one or combination of magnetic memory, optical memory, solid state memory or even remotely mounted memory, capable of storing data.

More specifically a second UE 900 is capable of communicating with a first UE and of applying a service which require exchange of service capabilities associate with users for enabling the users to communicate via the mentioned service. The memory 920 comprise instructions 930 which when executed by the processor 910 causes the second UE 900 to: receive, a service capabilities exchange invitation, requesting an exchange of service capabilities associated with the users of the two UEs, the request being received from the first UE, via a second signaling protocol other than a first signaling protocol, wherein the first signaling protocol has been previously applied by the first UE 700 when unsuccessfully requesting an exchange of service capabilities associated with the two users, when the first user, being a user of the first UE 700 is not authorized to access the service capabilities associated with a second user, being a user of the second UE 900; present options allowing the second user to accept or reject the requested service capabilities exchange, in case the second UE 900 is capable of interpreting the service capabilities exchange invitation as such a request, or present a message contained in the service capabilities exchange invitation, in case the second UE 900 is not capable of interpreting the service capabilities exchange invitation as a request for exchanging service capabilities.

The memory 920 may further comprise instructions which when executed by the processor 910 causes the second UE 900 to store the service capabilities exchanged with the first UE 700 and instructions, which causes the second UE 900 to execute the mentioned service, including also the second UE 900, at least partly based on the exchanged service capabilities, in case that service is initiated by any of the users, involving both users.

In addition, instructions may be configured to cause the second UE 900 to update the authorization rules of the second user such that the first user is allowed to access service capabilities associated with the second user, and initiate the requested service capabilities exchange, in case the user of the second UE 900 accepts the service capabilities exchange invitation, or reject the requested service capabilities exchange, in case the second UE 900 is not capable of interpreting the service capabilities exchange invitation as a request for exchanging service capabilities.

The instructions suggested above may be provided as a computer program comprising computer readable code units which may be provided as, or form part of a computer program product. In FIG. 9 computer program product 960 comprises storable means which is accessible by processor 910. Such a computer program product 970 may be arranged e.g. in the form of a non-volatile memory, such as e.g. an Electrical Erasable Programmable Read-Only Memory (EEPROM) a flash memory, a Random Access Memory (RAM), or a disc drive, accessible by the processor 910, which is capable of operating as a computer. In the latter case, the instructions 930 are typically arranged on a disc rather than on a memory, or on any other means capable of carrying computer readable instructions.

According to an alternative embodiment, the second UE 900 may instead be described as comprising a plurality of means or modules capable of interacting with each other. One such configuration is exemplified in FIG. 10 which describe a plurality of interacting means or modules, which may either be arranged as software modules, wherein the arrangement 1000 could constitute the instructions 930 as described above with reference to FIG. 9 or a part thereof. Alternatively, the modules may be arranged e.g. as Programmable Logic Devices (PLDs) or as any other type of hardware configuration. In the latter case the arrangement 1000 could constitute the processor 910 as described above with reference to FIG. 9 or a part thereof. It is also to be understood that modules may be configured as a combination of hardware and software implemented modules.

Figure 10:
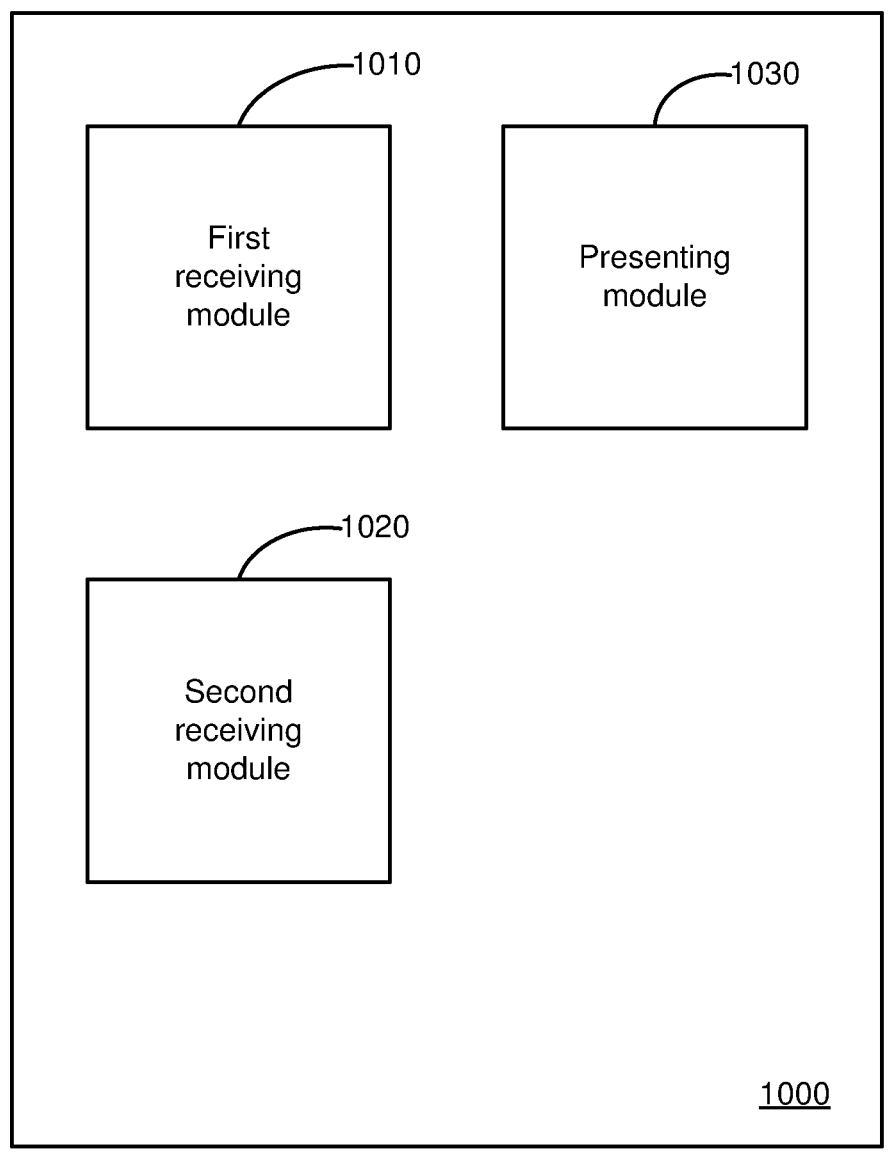
FIG. 10 is illustrating a configuration of the second UE according to one embodiment.

More specifically, the arrangement 1000 of FIG. 10 comprises a second receiving module 1020 for receiving, from the first UE 700, via a second signaling protocol other than a first signaling protocol previously applied by the first UE 700 when unsuccessfully requesting an exchange of service capabilities associated with the users of the UEs 700,900 from a first receiving module 1010 of the second UE 900, a service capabilities exchange invitation, requesting an exchange of service capabilities associated with the two users, when a first user being the user of the first UE 700 is not authorized to access the service capabilities associated with a second user being the user of the second UE 900, and a presenting module 1030 for presenting the service capabilities exchange invitation to the second user, such that the second user is provided with the options of accepting or rejecting the requested service capabilities exchange, in case the second UE is capable of interpreting the service capabilities exchange invitation as a request for exchanging service capabilities, or for presenting a message contained in the service capabilities exchange invitation, in case the second UE 900 is not capable of interpreting the service capabilities exchange invitation as a request for exchanging service capabilities. The presentation of the options mentioned above is typically provided by the presentation module 1030 via a user interface (not shown) of the second UE 900. In case the second UE 900 is not capable of interpreting the invitation as a service capabilities exchange request the conventional message handling and presentation functionality of the second UE 900 will instead be able to present the message contained in the invitation.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should be noted that FIGS. 8 and 10 merely illustrates various functional modules as implemented in the respective UE in a logical sense. The functionality in practice may however be implemented using any suitable software and hardware modules, means or circuits. Thus, the suggested embodiments are generally not limited to the shown structures of the UEs.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method, the method comprising:
a first user equipment (UE) sending via a first signaling protocol to a network node a service capabilities request that requests service capability information for a second UE and that triggers the network node to determine whether the network node is authorized to provide to the first UE the requested service capability information for the second UE;
the first UE receiving from the network node a response to the service capabilities request, the response rejecting the service capabilities request; and
as a result of the first UE receiving the response from the network node rejecting the service capabilities request, the first UE sending to the second UE, via a second signaling protocol other than the first signaling protocol, a service capabilities exchange invitation requesting an exchange of service capabilities.

2. The method of claim 1, further comprising, after sending the invitation to the second UE, the first UE receiving a service capabilities exchange message transmitted by the second UE as a result of a user of the second UE accepting the service capabilities exchange invitation.

3. The method of claim 1, wherein the response transmitted by the network node indicates that the network node is not authorized to provide to the first UE the service capability information for the second UE.

4. A method, the method comprising:
a second user equipment (UE) receiving a service capabilities exchange invitation requesting an exchange of service capabilities and containing a text message, wherein the service capabilities exchange invitation was automatically transmitted by a first UE and addressed to the second UE as a result of the first UE receiving a response message indicating that the second UE is not found as a contact in an address book; and
in response to receiving the service capabilities exchange invitation, the second UE displaying on a display screen of the second UE at least one of the text message contained in the service capabilities exchange invitation or a message asking a user of the second UE whether the user of the second UE would like to add to a friend's list a user associated with the first UE.

5. The method of claim 4, further comprising, in response to receiving the service capabilities exchange invitation, the second UE displaying on the display screen of the second UE a prompt prompting a user of the second UE to indicate whether or not the user wishes to have the second UE initiate an exchange of service capability information with the first UE.

6. The method of claim 5, comprising the further steps of:
the second UE transmitting to a network node a message for triggering the network node to update an authorization rule to produce an updated authorization rule that indicates that the network node is authorized to provide to the first UE service capability information for the second UE.

7. The method of claim 5, further comprising:
the second UE receiving a user input from the user, the input indicating that the user wishes to have the second UE initiate an exchange of service capability information with the first UE, and
as a result of the user input, the second UE transmitting to the first UE a message for initiating the exchange of service capability information.

8. The method of claim 4, wherein the service capabilities exchange invitation further comprises a Uniform Resource Locator (URL) for linking to information about a communication service that a user associated with the first UE is inviting the user associated with the second UE to join.

9. The method of claim 4, comprising:
the second UE displaying on a display screen of the second UE the message asking the user of the second UE whether the user of the second UE would like to add to the friend's list the user associated with the first UE, wherein the second UE displays the message as a result of recognizing the service capabilities exchange invitation.

10. A first user equipment (UE), the first UE comprising:
a processor; and
a memory, said memory comprising instructions which when executed by the processor causes the first UE to:
send via a first signaling protocol to a network node a service capabilities request that requests service capability information for a second UE and that triggers the network node to determine whether the network node is authorized to provide to the first UE the requested service capability information for the second UE; and as a result of receiving a response from the network node rejecting the service capabilities request, send to the second UE, via a second signaling protocol other than the first signaling protocol, a service capabilities exchange invitation requesting an exchange of service capabilities.

11. The first UE of claim 10, wherein the first UE is further operable to, after sending the invitation to the second UE, receive a service capabilities exchange message transmitted by the second UE as a result of a user of the second UE accepting the service capabilities exchange invitation.

12. The first UE of claim 11, wherein the first UE is further configured such that, after receiving the service capabilities exchange message transmitted by the second UE, the first UE executes a service capabilities exchange process with the second UE.

13. The first UE of claim 10, wherein the response transmitted by the network node indicates that the network node is not authorized to provide to the first UE the service capability information for the second UE.

14. The first UE of claim 10, wherein said second signaling protocol is one of: a) a Short Message Service (SMS) protocol and b) a Multimedia Messaging Service (MMS) protocol.

15. A computer program product for providing for communication between a first user equipment (UE) and a second UE, the computer program product comprising a non-transitory computer readable medium storing instructions for:

sending via a first signaling protocol to a network node a service capabilities request that requests service capability information for the second UE and that triggers the network node to determine whether the network node is authorized to provide to the first UE the requested service capability information for the second UE; and sending to the second UE, via a second signaling protocol other than the first signaling protocol, a service capabilities exchange invitation requesting an exchange of service capabilities as a result of receiving a response from the network node rejecting the service capabilities request.

16. A second user equipment (UE), the second UE comprising:

a processor; and a memory, said memory comprising instructions which when executed by the processor cause the second UE to:

obtain a service capabilities exchange invitation requesting an exchange of service capabilities and containing a text message, wherein the service capabilities exchange invitation was automatically transmitted by a first UE and addressed to the second UE as a result of the first UE receiving a response message indicating that the second UE is not found as a contact in an address book; and in response to obtaining the service capabilities exchange invitation, display on a display screen of the second UE at least one of the text message contained in the service capabilities exchange invitation, or a message asking a user of the second UE whether the user of the second UE would like to add to a friend's list a user associated with the first UE.

17. The second UE of claim 16, wherein the second UE is further configured to display on the display screen a prompt prompting the user of the second UE to indicate whether or not the user wishes to have the second UE initiate an exchange of service capability information with the first UE.

18. The second UE of claim 16, wherein the second UE is operable to receive from the user a user input indicating that the user wishes to have the second UE initiate an exchange of service capability information with the first UE, and the second UE is configured such that, as a result of the user input, the second UE transmits to the first UE a message for initiating an exchange of service capability information.

19. A computer program product, said computer program product comprising a non-transitory computer readable medium storing instructions for:

obtaining a service capabilities exchange invitation requesting an exchange of service capabilities and containing a text message, wherein the service capabilities exchange invitation was automatically transmitted by a first user equipment (UE) and addressed to a second UE as a result of the first UE receiving a response message indicating that the second UE is not found as a contact in an address book; and in response to receiving the service capabilities exchange invitation, displaying on a display screen at least one of the text message contained in the service capabilities exchange invitation or a message asking a user of the second UE whether the user of the second UE would like to add to a friend's list a user associated with the first UE.

* * * * *

UNITED STATES PATENT AND TRADEMARK OFFICE
CERTIFICATE OF CORRECTION

| | | |
|---|---|---|
| PATENT NO. | : 10,693,912 B2 | Page 1 of 1 |
| APPLICATION NO. | : 15/034724 | |
| DATED | : June 23, 2020 | |
| INVENTOR(S) | : Lidin et al. | |

It is certified that error appears in the above-identified patent and that said Letters Patent is hereby corrected as shown below:

In the Specification

In Column 7, Line 41, delete "According a" and insert -- According to a --, therefor.

In Column 8, Line 25, delete "FIG. 7, is a" and insert -- FIG. 7 is a --, therefor.

In Column 10, Line 20, delete "second UE 210B" and insert -- second UE 210b --, therefor.

In Column 10, Line 25, delete "step 2:2 More" and insert -- step 2:2. More --, therefor.

In Column 10, Line 67, delete "(SMS)," and insert -- (SMS)", --, therefor.

In Column 11, Lines 39-40, delete "http:/communication_service_A.bestprovider.com"" and insert -- http:/communication_service_A.bestprovider.com". --, therefor.

In Column 18, Line 39, delete "computer program product 970" and insert -- computer program product 960 --, therefor.

In Column 19, Line 32, delete "illustrates" and insert -- illustrate --, therefor.

Signed and Sealed this
Twenty-second Day of September, 2020

Andrei Iancu
*Director of the United States Patent and Trademark Office*